United States Patent
Gomila et al.

(10) Patent No.: US 9,204,173 B2
(45) Date of Patent: Dec. 1, 2015

(54) METHODS AND APPARATUS FOR ENHANCED PERFORMANCE IN A MULTI-PASS VIDEO ENCODER

(75) Inventors: Cristina Gomila, Princeton, NJ (US); Xiaoan Lu, Princeton, NJ (US); Gokce Dane, San Diego, CA (US)

(73) Assignee: Thomson Licensing, Issy les Moulineaux (FR)

( * ) Notice: Subject to any disclaimer, the term of this patent is extended or adjusted under 35 U.S.C. 154(b) by 1774 days.

(21) Appl. No.: 12/309,249

(22) PCT Filed: Jun. 15, 2007

(86) PCT No.: PCT/US2007/014019
§ 371 (c)(1),
(2), (4) Date: May 8, 2009

(87) PCT Pub. No.: WO2008/008150
PCT Pub. Date: Jan. 17, 2008

(65) Prior Publication Data
US 2009/0323803 A1      Dec. 31, 2009

Related U.S. Application Data

(60) Provisional application No. 60/806,862, filed on Jul. 10, 2006.

(51) Int. Cl.
*H04N 7/66*   (2006.01)
*H04N 19/86*  (2014.01)
(Continued)

(52) U.S. Cl.
CPC ............ *H04N 19/86* (2014.11); *H04N 19/115* (2014.11); *H04N 19/117* (2014.11);
(Continued)

(58) Field of Classification Search
CPC ...................................................... H04N 19/86
USPC ......................................... 375/240.01, 240.02
IPC ....................................................... H04N 7/12
See application file for complete search history.

(56) References Cited

U.S. PATENT DOCUMENTS 5,249,053 A    9/1993  Jain
5,640,208 A    6/1997  Fujinami
(Continued)

FOREIGN PATENT DOCUMENTS

CN     1756357    4/2006
EP     1513349    3/2005
(Continued)

OTHER PUBLICATIONS

European Search Report dated Mar. 20, 2008.
(Continued)

*Primary Examiner* — Jay Patel
*Assistant Examiner* — Yulin Sun
(74) *Attorney, Agent, or Firm* — Robert D. Shedd; Julia Tanase (57) ABSTRACT

There are provided methods and apparatus for enhanced performance in a multi-pass video encoder. An apparatus includes a video encoder for encoding a video bitstream. The apparatus further includes a video quality analyzer, in signal communication with the encoder, for performing a video quality analysis of the video bitstream for a given encoding pass to detect encoder compression artifacts in the video bitstream, and providing to the encoder information relating to the encoder compression artifacts to enable a re-encoding setup of the encoder to reduce an occurrence of the encoder compression artifacts in subsequent re-encoding passes. At least one of the video quality analysis and the re-encoding setup are automated.

24 Claims, 5 Drawing Sheets

(51) Int. Cl.
*H04N 19/172* (2014.01)
*H04N 19/115* (2014.01)
*H04N 19/61* (2014.01)
*H04N 19/117* (2014.01)
*H04N 19/154* (2014.01)
*H04N 19/156* (2014.01)
*H04N 19/162* (2014.01)
*H04N 19/179* (2014.01)
*H04N 19/192* (2014.01)
*H04N 19/82* (2014.01)

(52) U.S. Cl.
CPC .......... *H04N 19/154* (2014.11); *H04N 19/156* (2014.11); *H04N 19/162* (2014.11); *H04N 19/172* (2014.11); *H04N 19/179* (2014.11); *H04N 19/192* (2014.11); *H04N 19/61* (2014.11); *H04N 19/82* (2014.11)

(56) References Cited

U.S. PATENT DOCUMENTS

| | | | | |
|---|---|---|---|---|
| 6,529,631 B1 * | 3/2003 | Peterson et al. | ............. | 382/232 |
| 2002/0024999 A1 | 2/2002 | Yamaguchi et al. | | |
| 2003/0165324 A1 * | 9/2003 | O'Connor et al. | ............. | 386/69 |
| 2007/0047648 A1 * | 3/2007 | Tourapis et al. | ......... | 375/240.13 |
| 2007/0094583 A1 * | 4/2007 | Randall et al. | ............ | 715/500.1 |

FOREIGN PATENT DOCUMENTS

| | | |
|---|---|---|
| EP | 1646243 | 4/2006 |
| JP | H8129831 | 5/1996 |
| JP | 200258029 | 2/2002 |
| WO | WO97/37322 | 10/1997 |
| WO | WO2004/080050 | 9/2004 |

OTHER PUBLICATIONS

MPEG-2, ISO/IEC 13818, "Information technology—Generic coding of moving pictures and associated audio information: Systems," 1st edition Apr. 15, 1996, 138 pages.

ITU-T H.264, "Advanced Video Coding for Generic Audiovisual Services," 2nd ITU-T edition—Series H: Audiovisual and Multimedia Systems, Mar. 2005, 343 pages.

* cited by examiner

METHODS AND APPARATUS FOR ENHANCED PERFORMANCE IN A MULTI-PASS VIDEO ENCODER

CROSS-REFERENCE TO RELATED APPLICATIONS

This application claims the benefit, under 35 U.S.C. §365 of International Application PCT/US2007/14019, filed on Jun. 15, 2007, which was published in accordance with PCT Article 21(2) on Jan. 17, 2008, in English and which claims the benefit of U.S. provisional patent application No. 60/806,862, filed on Jul. 10, 2006.

FIELD OF THE INVENTION

The present invention relates generally to video encoding and, more particularly, to methods and apparatus for enhanced performance in a multi-pass video encoder.

BACKGROUND OF THE INVENTION

Video coding methods are used to find efficient coding representations for digital video. Unfortunately, this can hardly be achieved without some loss of quality given the large amounts of data involved. Loss of quality often translates into loss of detail. For example, textured regions are perceived softer and small details tend to vanish from the decompressed picture. At high compression ratios, decompressed pictures may even include visible errors, also referred to as "artifacts". Artifacts are typically the result of quantization in lossy video compression. Compression artifacts may cause parts of the picture, particularly fast moving portions, to be displayed distorted or missing.

In order to reduce the appearance of compression artifacts, non real-time encoding applications (such as DVD authoring) seeking high picture quality often require an operator to manually fine tune the encoder parameters. Such process of manually fine-tuning the encoding parameters is known as assisted re-encoding.

In current DVD production workflow, assisted re-encoding may consume more than sixty percent of the total time required to complete the encoding of a movie title. Furthermore, with the introduction of high definition formats and higher resolution displays, compression artifacts become more visible while nearly lossless compression is often sought.

Figure 1:
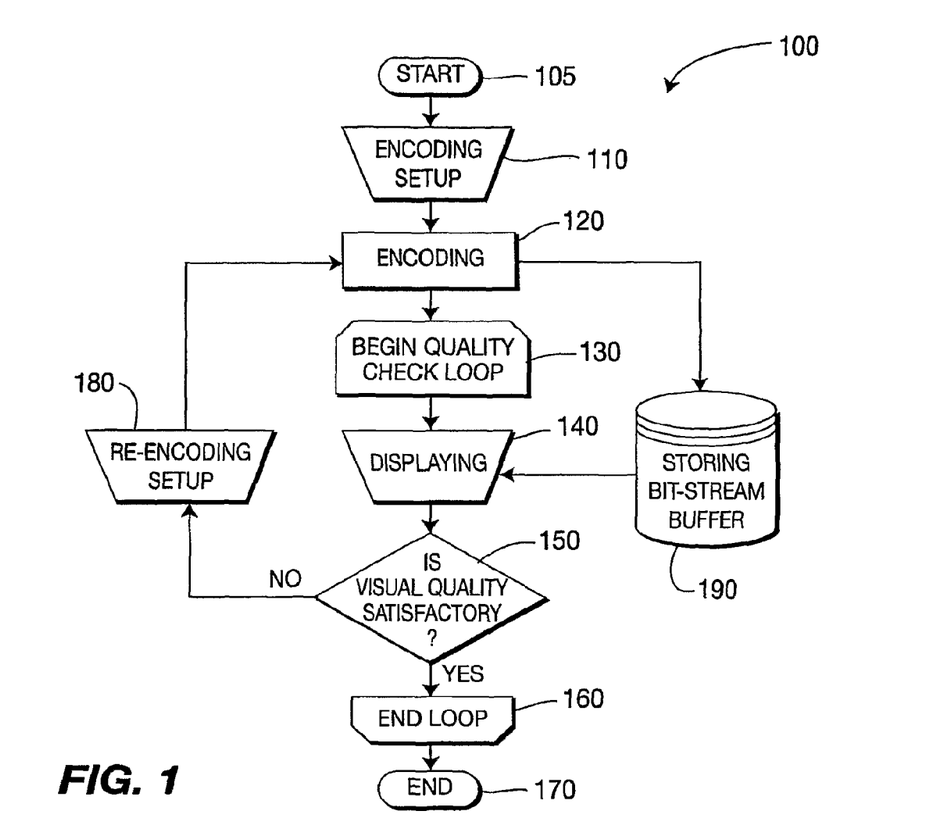
FIG. 1 is a flow diagram for a method for non real-time video encoding with assisted re-encoding, in accordance with the prior art.

Turning to FIG. 1, a method for non real-time video encoding with assisted re-encoding is indicated generally by the reference numeral 100. The method 100 includes a start block 105 that passes control to a function block 110. The function block 110 performs an encoding setup, and passes control to a function block 120. The function block 120 performs encoding with respect to a current picture in a video sequence, and passes control to a function block 190 and a loop limit block 130.

The function block 190 stores the bitstream in a buffer, and passes control to a function block 140.

The loop limit block 130 begins a quality check loop that loops over each picture in the video sequence, and passes control to a function block 140.

The function block 140 displays each of the pictures in the video sequence for quality assessment, and passes control to a decision block 150. The decision block 150 determines whether or not the visual quality is satisfactory. If so, then control is passed to a loop limit block 160. Otherwise, control is passed to a function block 180.

The function block 160 ends the loop over each picture in the video sequence, and passes control to an end block 170.

The function block 180 performs a re-encoding setup, and returns control to the function block 120.

Various elements of the method 100 of FIG. 1 will now be further described. The encoder setup is performed at function block 110, typically with the aid of an operator. The encoder setup may involve the setup of the target bit-rate as well as the specification of any set of parameters involved in the encoding process. Function block 120 represents an automated encoding process. This can be single or multi-pass encoding and, in some cases, may comply with an existing video coding standard such as, for example, the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), the ISO/IEC MPEG-2 standard, the ITU-T H.263 recommendation, and so forth. The result of the encoding process is saved in memory at the function block 190. After encoding, the operator will proceed to check the visual quality of the encoded stream (function blocks 130 to 160). Visual quality assessment is done in most cases through a graphical display (function block 140) and may involve the decoding of the pictures in the encoded stream. If the operator considers that the quality of a picture or a set of pictures is not satisfactory, he/she may decide to manually test a different encoding setup (function block 180) and proceed to encode again through function block 120. This process is called assisted re-encoding since it requires the intervention of an operator. This process is repeated as necessary until the visual quality is considered satisfactory.

Most applications following the workflow represented by FIG. 1 devote more than sixty percent of the time that it takes to go from function block 100 to function block 170 to the re-encoding process.

SUMMARY OF THE INVENTION

These and other drawbacks and disadvantages of the prior art are addressed by the present invention, which is directed to methods and apparatus for enhanced performance in a multi-pass video encoder.

According to an aspect of the present principles, there is provided an apparatus for multi-pass video encoding. The apparatus includes a video encoder for encoding a video bitstream. The apparatus further includes a video quality analyzer, in signal communication with the encoder, for performing a video quality analysis of the video bitstream for a given encoding pass to detect encoder compression artifacts in the video bitstream, and providing to the encoder information relating to the encoder compression artifacts to enable a re-encoding setup of the encoder to reduce an occurrence of the encoder compression artifacts in subsequent re-encoding passes. At least one of the video quality analysis and the re-encoding setup are automated.

According to another aspect of the present principles, there is provided an apparatus for use with a multi-pass video encoder. The apparatus includes a video quality analyzer for performing a video quality analysis of the video bitstream for a given encoding pass to detect encoder compression artifacts in the video bitstream, and providing the video encoder with information relating to the encoder compression artifacts to enable a re-encoding setup of the video encoder to reduce an occurrence of the encoder compression artifacts in subsequent re-encoding passes. At least one of the video quality analysis and the re-encoding setup are automated.

According to yet another aspect of the present principles, there is provided a method for multi-pass video encoding. The method includes encoding a video bitstream in a given encoding pass. The method also includes performing a video quality analysis of the video bitstream encoded in the given encoding pass to detect encoder compression artifacts therein. The method further includes performing a re-encoding setup with respect to the video bitstream to reduce an occurrence of the encoder compression artifacts in subsequent re-encoding passes, based on information obtained from the video quality analysis relating to the encoder compression artifacts. At least one of the video quality analysis and the re-encoding setup are automated.

According to still another aspect of the present principles, there is provided a method for use with a multi-pass video encoder. The method includes performing a video quality analysis of the video bitstream for a given encoding pass to detect encoder compression artifacts in the video bitstream. The method also includes providing the video encoder with information relating to the encoder compression artifacts to enable a re-encoding setup of the video encoder to reduce an occurrence of the encoder compression artifacts in subsequent re-encoding passes. At least one of the video quality analysis and the re-encoding setup are automated.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed to methods and apparatus for enhanced performance in a multi-pass video encoder.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment. Moreover, given the teachings of the present principles provided herein, it is to be appreciated that two or more embodiments and/or portions thereof may be readily combined, as determined by one of ordinary skill in this and related arts, while maintaining the scope of the present principles In accordance with the present principles, methods and apparatus are provided for enhanced performance in a multi-pass video encoder. Non-real-time video encoding applications seeking high picture quality, such as DVD authoring, often require an operator to manually fine tune the encoder parameters to reduce the appearance of compression artifacts. Such a process is known as assisted re-encoding. Advantageously, embodiments of the present principles minimize the number of cases requiring assisted re-encoding. In an embodiment, the number of cases requiring assisted re-encoding is minimized by automating the detection of compression artifacts with the aid of a visual quality analyzer and/or by automating adjustments in the encoder configuration to prevent the appearance of such artifacts.

Figure 2:
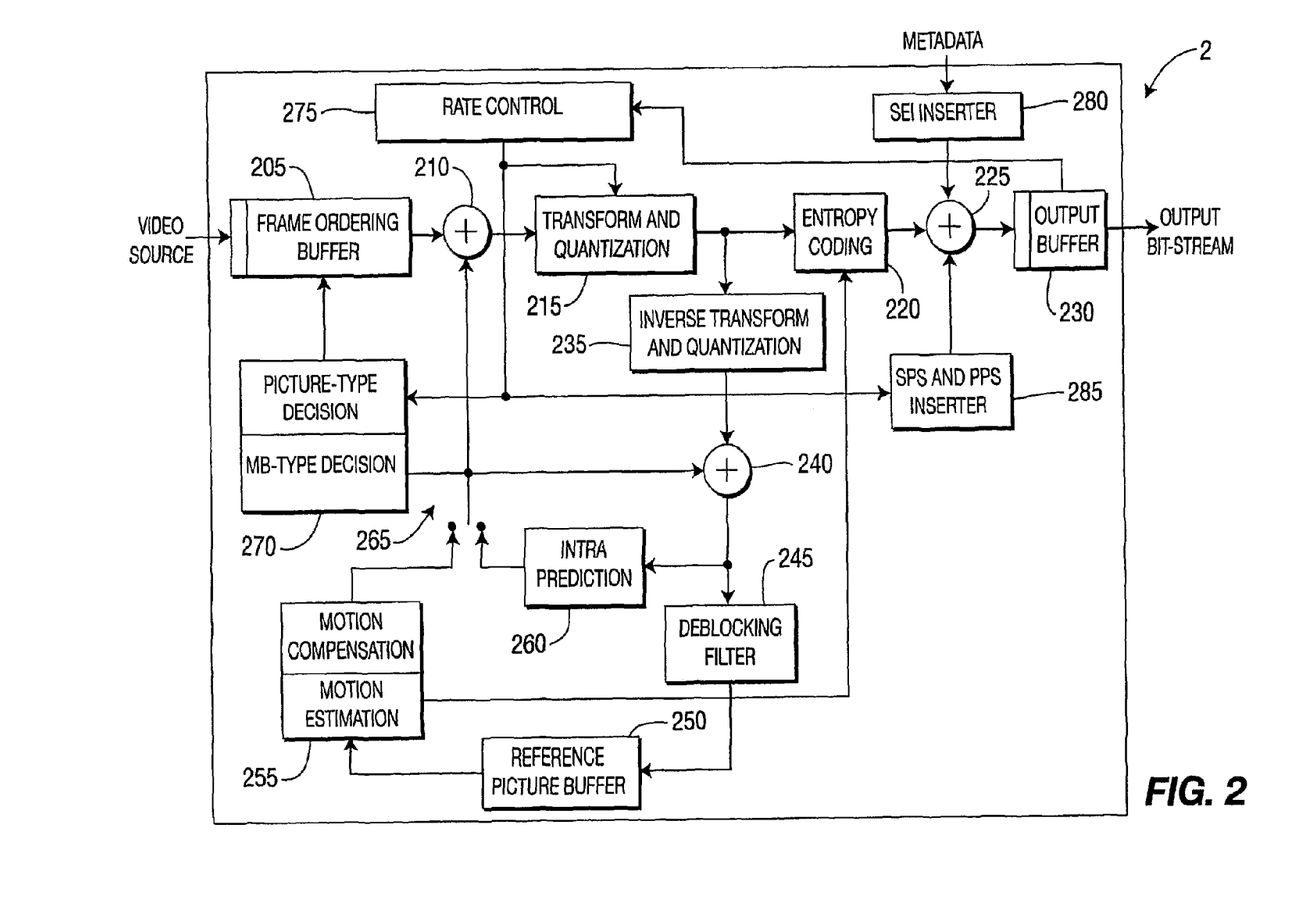
FIG. 2 is a block diagram for an exemplary video encoder to which the present principles may be applied, in accordance with an embodiment of the present principles.

Turning to FIG. 2, an exemplary video encoder to which the present principles may be applied is indicated generally by the reference numeral 200. The encoder 200 includes a frame ordering buffer 205. A first input of the frame ordering buffer 205 is available as an input to the encoder 200. An output of the frame ordering buffer 205 is connected in signal communication with a first non-inverting input of a combiner 210. An output of the combiner 210 is connected in signal communication with a first input of a transformer and quantizer 215. An output of the transformer and quantizer 215 is connected in signal communication with a first input of an entropy coder 220 and an input of an inverse transformer and quantizer 235. An output of the entropy coder is connected in signal communication with a first non-inverting input of a combiner 225. An output of the combiner 225 is connected in signal communication with an input of an output buffer 230. A first output of the output buffer 230 is connected in signal communication with an input of a rate controller 275. An output of the rate controller 275 is connected in signal communication with a second input of the transformer and quantizer 215, an input of a picture-type and macroblock (MB) type decision module 270, and an input of a Sequence Parameter Set (SPS) and Picture Parameter Set (PPS) inserter 285. A first output of the picture-type and macroblock-type decision module 270 is connected in signal communication with a second input of the frame ordering buffer 205. A second output of the picture-type and macroblock-type decision module 270 is connected in signal communication with a first non-inverting input of a combiner 240 and with an output of a switch 265. An input of the switch 265 is connected in signal communication with either a second output of a motion compensator/motion estimator 255 or an output of an intra prediction module 260. An output of the combiner 240 is connected in signal communication with an input of the intra prediction module 260 and an input of a deblocking filter 245. An output of the deblocking filter 245 is connected in signal communication with an input of a reference picture buffer 250. An output of the reference picture buffer 250 is connected in signal communication with an input of the motion compensator/motion estimator 255. A first output of the motion compensator/motion estimator 255 is connected in signal communication with a second input of the entropy coder 220. An output of the SPS and PPS inserter 285 is connected in signal communication with a second non-inverting input of the combiner 225. An output of a Supplemental Enhancement Information (SEI) inserter 280 is connected in signal communication with a third non-inverting input of the combiner 225. An input of the SEI inserter 280 is available as an input to the encoder 200, for receiving metadata. A second output of the output buffer 230 is available as an output of the encoder 200.

Figure 3:
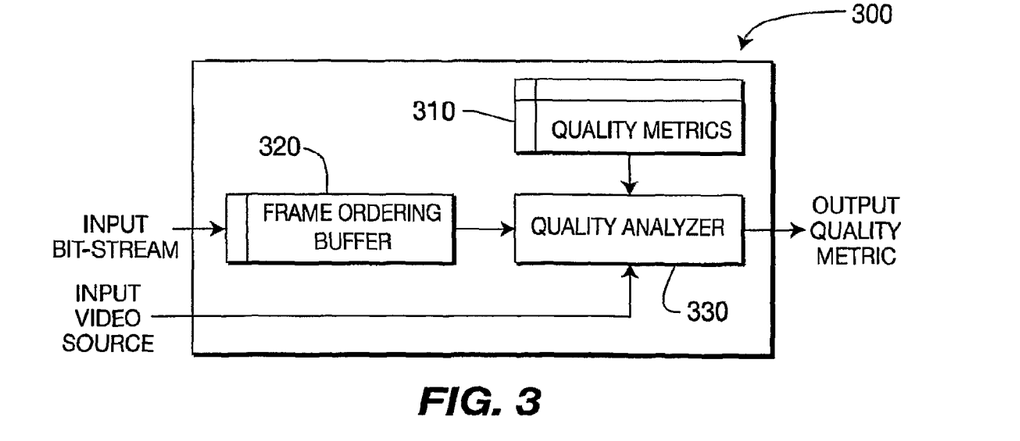
FIG. 3 is a block diagram for an exemplary video quality analysis system to which the present principles may be applied, in accordance with an embodiment of the present principles.

Turning to FIG. 3, an exemplary video quality analysis system to which the present principles may be applied is indicated generally by the reference numeral 300. The quality analysis system 300 includes a frame ordering buffer 320 and a quality analyzer 330. An input of the frame ordering buffer 320 is available as an input to the quality analysis system 300, for receiving an input bitstream. A first input of the quality analyzer 330 is also available as an input to the quality analysis system 300. An output of the frame ordering buffer 320 is connected in signal communication with a second input of the quality analyzer 330. A third input of the quality analyzer 330 is connected in signal communication with an output of a quality metrics module 310. An output of the quality analyzer 330 is available as an output of the quality analysis system 300.

Advantageously, the method and apparatus in accordance with the present principles is capable of minimizing the number of cases requiring assisted re-encoding. In an embodiment, this is done by automating the detection of compression artifacts with the aid of a video quality analyzer. In an embodiment, information resulting from the automated detection of compression artifacts by the video quality analyzer is provided to the encoder and allows automated adjustments in the encoder configuration to minimize the appearance of such artifacts in subsequent encoding passes.

Figure 4:
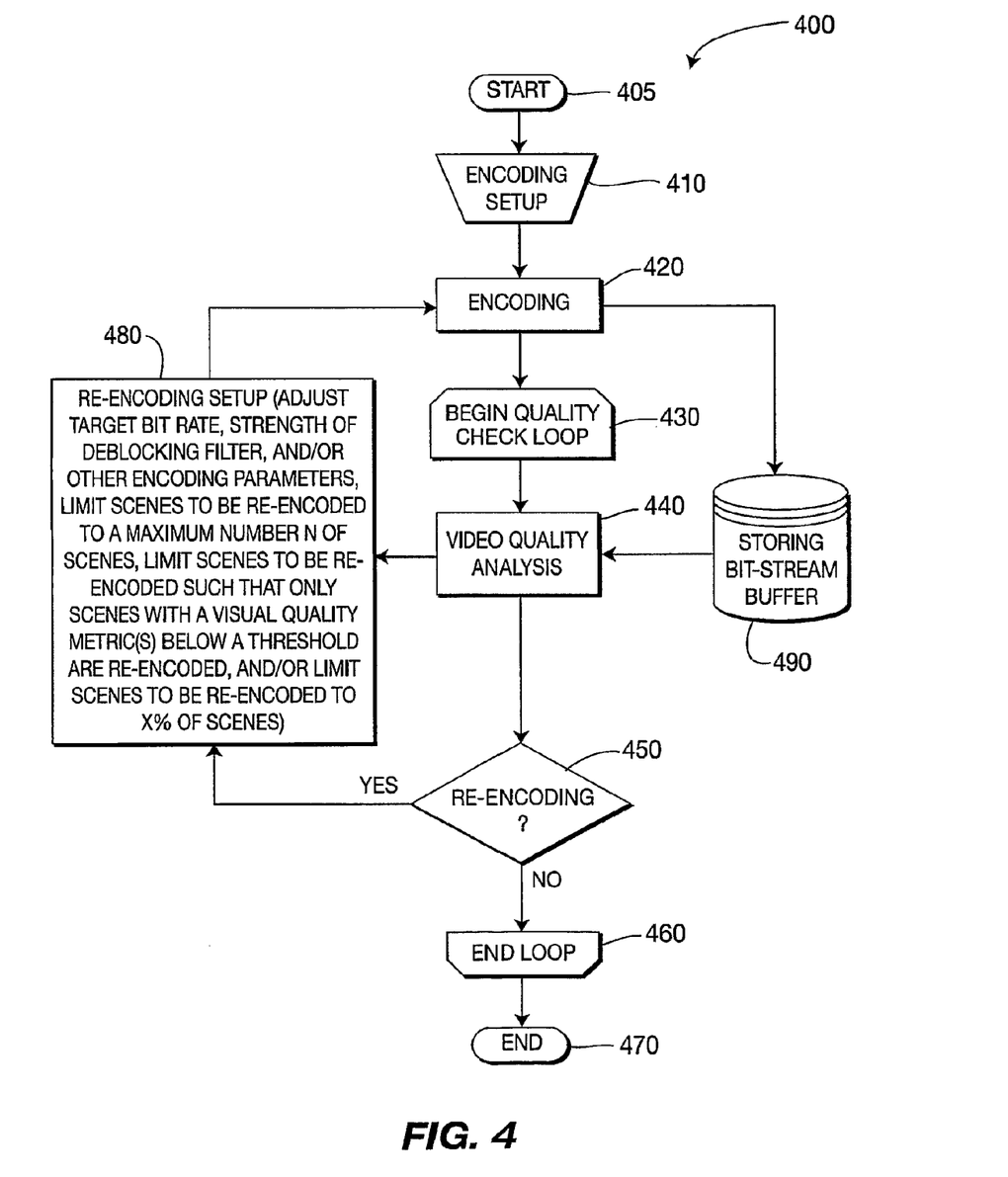
FIG. 4 is a flow diagram for an exemplary method for non real-time, multi-pass video encoding with assisted re-encoding, in accordance with an embodiment of the present principles.

Turning to FIG. 4, an exemplary method for non real-time, multi-pass video encoding with assisted re-encoding is indicated generally by the reference numeral 400. The method 400 includes a start block 405 that passes control to a function block 410. The function block 410 performs an encoding setup, and passes control to a function block 420. The function block 420 performs encoding with respect to a current picture in a video sequence, and passes control to a function block 490 and a loop limit block 430.

The function block 490 stores the bitstream in a buffer, and passes control to a function block 440.

The loop limit block 430 begins a quality check loop that loops over each picture in the video sequence, and passes control to a function block 440.

The function block 440 performs a video quality analysis, and passes control to a decision block 450. The decision block 450 determines whether or not re-encoding is to be performed. If so, then control is passed to a function block 480. Otherwise, control is passed to a loop limit block 460.

The function block 460 ends the loop over each picture in the video sequence, and passes control to an end block 470.

The function block 480 performs a re-encoding setup, and returns control to the function block 420. Regarding function block 480, the re-encoding setup performed thereby may involve, for example, adjusting the target bit rate, the strength of the deblocking filter, and/or other encoding parameters, and/or limiting the scenes to be re-encoded. For example, function block 480 may limit the scenes to be re-encoded to a maximum number N of scenes (e.g., the N scenes with the worst quality), may limit the scenes to be re-encoded such that only scenes with a visual quality metric(s) below a threshold, and/or may limit the scenes to be re-encoded to X % of scenes (e.g., starting from those with the worst quality). In the preceding examples given with respect to function block 480, variable X denotes a selected percentage, and may be represented by an integer value or non-integer value.

When compared to the method 100 of FIG. 1, it is to be noticed that the assisted quality checking process (function blocks 430 to 460) of the method 400 of FIG. 4 is fully automated.

As part of this new process, a video quality analyzer (function block 440) is responsible for the computation of at least one visual quality metric. Examples of visual quality metrics that may be used as part of this invention include, but are not limited to, Just Noticeable Distortion (JND) or Peak Power Noise Ratio (PPNR). That is, while the present principles are described herein with respect to the JND and PPNR as visual quality metrics, the present principles are not solely limited to these visual quality metrics and, thus, other visual quality metrics, as readily determined by one of ordinary skill in this and related arts, may also be utilized in accordance with the present principles, while maintaining the scope of the present principles.

JND measures the perceptual lower bound of the signal distortion. This measure relies on the observation that the human visual system can detect luminance differences rather than absolute intensity. Furthermore, sensitivity of the luminance contrast depends on the average background intensity. JND represents the threshold below which the distortion is imperceptible. JND may be represented as follows:

$$JND_{ij} = \max\{f_1(bg_{ij}, mg_{ij}), f_2(bg_{ij})\} \quad (1)$$

where $bg_{ij}$ and $mg_{ij}$ are the average background luminance and the maximum weighted average of luminance differences around pixel at (i,j), respectively. Functions $f_1$ and $f_2$ may be represented by the following:

$$f_1(bg_{ij}, mg_{ij}) = mg_{ij}\alpha(bg_{ij}) + \beta(bg_{ij}) \quad (2)$$

$$f_2(bg_{ij}) = \begin{cases} T_0\left(1 - \left(\frac{bg_{ij}}{127}\right)^2\right) + 3 & bg_{ij} \leq 127 \\ \gamma(bg_{ij} - 127) + 3 & bg_{ij} > 127 \end{cases} \quad (3)$$

Regarding Equation (2), $\alpha(\ )$ and $\beta(\ )$ may be represented by the following:

$$\alpha(bg_{ij}) = bg_{ij} \times 0.0001 + 0.115 \quad (4)$$

$$\beta(bg_{ij}) = \lambda - bg_{ij} \times 0.01 \quad (5)$$

with $T_0 = 17$, $\gamma = 3/128$ and $\lambda = 1/2$.

By using JND, PPNR is defined as follows:

$$PPNR = 20\log_{10} \frac{255}{\sqrt{\frac{1}{MN}\sum_{i=1}^{M}\sum_{j=1}^{N}(|x_{ij} - \hat{x}_{ij}| - JND_{ij})^2 \delta_{ij}}} \quad (6)$$

with $$\delta_{ij} = \begin{cases} 1, & \text{if } |x_{ij} - \hat{x}_{ij}| > JND_{ij} \\ 0, & \text{if } |x_{ij} - \hat{x}_{ij}| \leq JND_{ij} \end{cases} \quad (7)$$

where M and N represent the picture width and height of the picture, respectively; $x_{ij}$ represents the value of the pixel at (i, j) and $\hat{x}_{ij}$ represents the reconstructed pixel at (i,j).

In an embodiment, the video quality analyzer may take the compressed bitstream as input and operate in the compressed domain. In another embodiment the video quality analyzer may take as input the decompressed video and the original sequence in order to get more accurate measures.

The quality metrics resulting from the video quality analyzer are used to assess the need for re-encoding. If at least one metric, and/or a combination of metrics, is below a specified or calculated threshold (function block 450), the system proceeds to re-encode that picture or group of pictures.

In an embodiment, the re-encoding setup in function block 480 is also fully automated. This process takes as input the previous encoding parameters and the data resulting from the video quality analyzer. Re-encoding setup may utilize bit-rate variations and changes to any encoding parameter that could affect the perceived visual quality.

In an embodiment, the system may increase the average bit-rate on those pictures for which the quality metrics are below the specified thresholds. In another embodiment, the system may increase the strength of the deblocking filter when blockiness is measured in the decompressed pictures. In yet another embodiment, for which the encoding process will comply with the MPEG-4 AVC standard, the system may enable weighted prediction when low quality metrics are measured on gradual transitions. The changes above could affect the entire picture or could optionally be set up at the macroblock-level for all those encoding parameters.

Re-encoding may be repeated until the video quality metrics measured are above a specified or calculated threshold.

Figure 5:
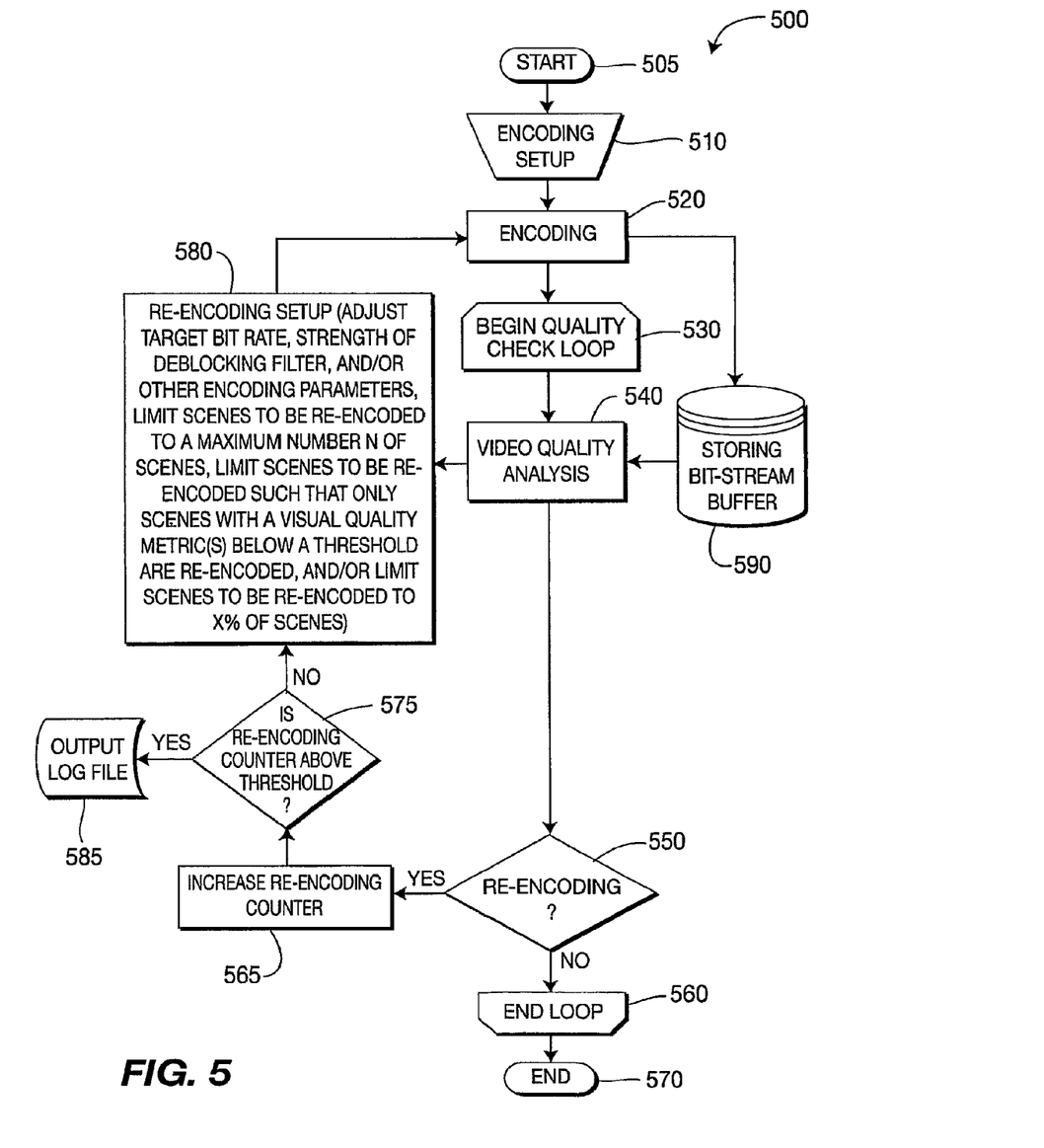
FIG. 5 is a flow diagram for an exemplary method for non real-time, multi-pass video encoding with assisted re-encoding, in accordance with an embodiment of the present principles.

Turning to FIG. 5, an exemplary method for non real-time, multi-pass video encoding with assisted re-encoding is indicated generally by the reference numeral 500. The method 500 includes a start block 505 that passes control to a function block 510. The function block 510 performs an encoding setup, and passes control to a function block 520. The function block 520 performs encoding with respect to a current picture in a video sequence, and passes control to a function block 590 and a loop limit block 530.

The function block 590 stores the bitstream in a buffer, and passes control to a function block 540.

The loop limit block 530 begins a quality check loop that loops over each picture in the video sequence, and passes control to a function block 540.

The function block 540 performs a video quality analysis, and passes control to a decision block 550 and a function block 580. The decision block 550 determines whether or not re-encoding is to be performed. If so, then control is passed to a function block 565. Otherwise, control is passed to a loop limit block 560.

The function block 560 ends the loop over each picture in the video sequence, and passes control to an end block 570.

The function block 565 increases a re-encoding counter by one, and passes control to a decision block 575. The decision block 575 determines whether or not a value of the re-encoding counter is above a threshold. If so, then control is passed to a function block 585. Otherwise, control is passed to the function block 580.

The function block 585 outputs a log file, and passes control to the end block 570.

The function block 580 performs a re-encoding setup, and returns control to the function block 520. Regarding function block 580, the re-encoding setup performed thereby may involve, for example, adjusting the target bit rate, the strength of the deblocking filter, and/or other encoding parameters, and/or limiting the scenes to be re-encoded. For example, function block 580 may limit the scenes to be re-encoded to a maximum number N of scenes (e.g., the N scenes with the worst quality), may limit the scenes to be re-encoded such that only scenes with a visual quality metric(s) below a threshold, and/or may limit the scenes to be re-encoded to X % of scenes (e.g., starting from those with the worst quality). In the preceding examples given with respect to function block 580, variable X denotes a selected percentage, and may be represented by an integer value or non-integer value.

In the workflow represented by the method 500 of FIG. 5, the automated re-encoding process will stop when a certain number of re-encoding passes have been completed (function block 575). When the re-encoding process is forced to stop without having achieved the expected picture quality levels, an output report may optionally be created. The output report can be used by the operator to decide whether assisted re-encoding is needed.

In an embodiment relating to the method 500 of FIG. 5, the automated re-encoding method based on the computation of visual quality metrics does not pretend to suppress the need for assisted re-encoding, but to reduce the number of cases requiring human assistance. One advantage of this method over the prior art method is that the total processing time is bounded.

Figure 6:
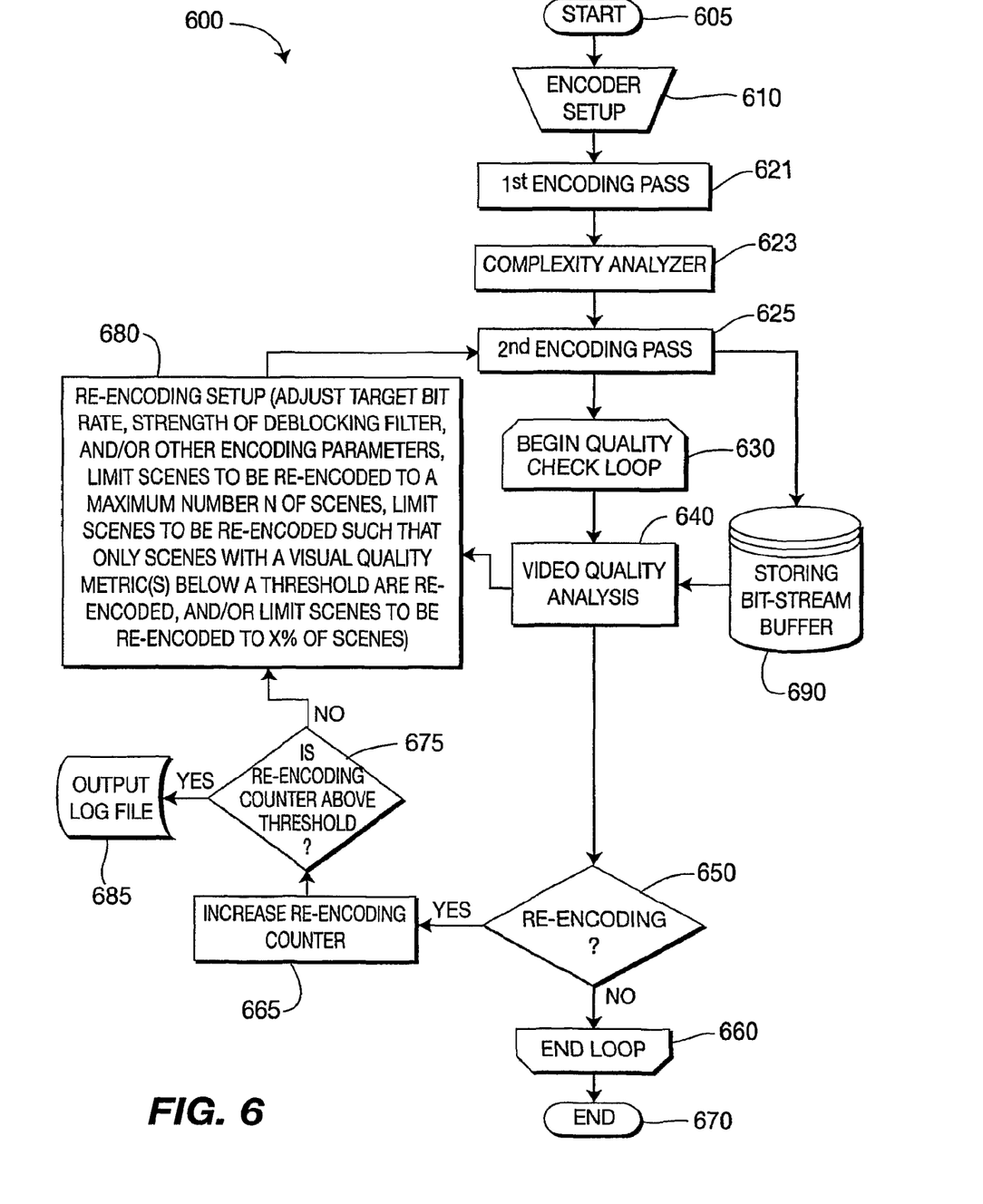
FIG. 6 is a flow diagram for an exemplary method for non real-time, two-pass video encoding with assisted re-encoding, in accordance with an embodiment of the present principles.

FIG. 6 illustrates an embodiment when a two-pass encoding algorithm is used.

Turning to. FIG. 6, an exemplary method for non real-time, two-pass video encoding with assisted re-encoding is indicated generally by the reference numeral 600. The method 600 includes a start block 605 that passes control to a function block 610. The function block 610 performs an encoding setup, and passes control to a function block 621. The function block 621 performs a first encoding pass with respect to a current picture in a video sequence, and passes control to a function block 623. The function block 623 performs a complexity analysis, and passes control to a function block 625. The function block 625 performs a second encoding pass, and passes control to a function block 690 and a loop limit block 630.

The function block 690 stores the bitstream in a buffer, and passes control to a function block 640.

The loop limit block 630 begins a quality check loop that loops over each picture in the video sequence, and passes control to the function block 640.

The function block 640 performs a video quality analysis, and passes control to a decision block 650 and a function block 680. The decision block 650 determines whether or not re-encoding is to be performed. If so, then control is passed to a function block 665. Otherwise, control is passed to a loop limit block 660.

The function block 660 ends the loop over each picture in the video sequence, and passes control to an end block 670.

The function block 665 increases a re-encoding counter by one, and passes control to a decision block 675. The decision block 675 determines whether or not a value of the re-encoding counter is above a threshold. If so, then control is passed to a function block 685. Otherwise, control is passed to the function block 680.

The function block 685 outputs a log file, and passes control to the end block 670.

The function block 680 performs a re-encoding setup, and returns control to the function block 625. Regarding function block 680, the re-encoding setup performed thereby may involve, for example, adjusting the target bit rate, the strength of the deblocking filter, and/or other encoding parameters, and/or limiting the scenes to be re-encoded. For example, function block 680 may limit the scenes to be re-encoded to a maximum number N of scenes (e.g., the N scenes with the worst quality), may limit the scenes to be re-encoded such that only scenes with a visual quality metric(s) below a threshold, and/or may limit the scenes to be re-encoded to X % of scenes (e.g., starting from those with the worst quality). In the preceding examples given with respect to function block 680, variable X denotes a selected percentage, and may be represented by an integer value or non-integer value.

Various elements of the method 600 of FIG. 6 will now be further described with respect to an embodiment of the present principles. Function block 621 represents the first encoding pass, which may run at fixed quantization point (QP), constant bit-rate, or even be limited to a pre-analysis pass. Function block 623 represents the complexity analyzer process that determines the final bit-rate allocation based on the data from the first pass. Function block 625 represents the second encoding pass that creates the output bit-stream. Note that re-encoding only requires the execution of the second encoding pass at function block 625. The method 600 of FIG. 6 can be easily extended to support encoding algorithms with more than two passes, as would be apparent to those of ordinary skill in this and related arts, while maintaining the scope of the present principles.

It is to be appreciated that one or both of the video quality analysis and the re-encoding setup may be automated. For example, the video quality analysis performed by function blocks 440, 540, and 640 in FIGS. 4, 5, and 6, respectively may be automated, and/or the re-encoding setup performed by function blocks 480, 580, and 680 in FIGS. 4, 5, and 6, respectively. Given the teachings of the present principles provided herein, these and other variations and implementations of the present principles are readily implemented by one of ordinary skill in this and related arts, while maintaining the scope of the present principles.

A description will now be given of some of the many attendant advantages/features of the present invention, some of which have been mentioned above. For example, one advantage/feature is an apparatus for multi-pass video encoding that includes a video encoder and a video quality analyzer in signal communication with the encoder. The video encoder is for encoding a video bitstream. The video quality analyzer is for performing a video quality analysis of the video bitstream for a given encoding pass to detect encoder compression artifacts in the video bitstream, and providing to said encoder information relating to the encoder compression artifacts to enable a re-encoding setup of said encoder to reduce an occurrence of the encoder compression artifacts in subsequent re-encoding passes. At least one of the video quality analysis and the re-encoding setup are automated.

Another advantage/feature is the apparatus having the video encoder and video quality analyzer as described above, wherein the video quality analyzer detects encoder compression artifacts by computing visual quality metrics.

Yet another advantage/feature is the apparatus having the video encoder and video quality analyzer as described above, wherein the re-encoding setup involves adjusting a target bit rate.

Still another advantage/feature is the apparatus having the video encoder and video quality analyzer as described above, wherein the video encoder includes a deblocking filter, and the re-encoding setup involves adjusting a strength of the deblocking filter.

Moreover, another advantage/feature is the apparatus having the video encoder and video quality analyzer as described above, wherein the re-encoding setup involves adjusting encoding parameters.

Further, another advantage/feature is the apparatus having the video encoder and video quality analyzer as described above, wherein a total number of re-encoding passes is constrained to a maximum value.

Also, another advantage/feature is the apparatus having the video encoder and video quality analyzer as described above, wherein the video quality analyzer outputs a log file with data intended to assist an operator during assisted re-encoding.

Additionally, another advantage/feature is the apparatus having the video encoder and video quality analyzer as described above, wherein the video encoder is compliant with the International Organization for Standardization/International Electrotechnical Commission Moving Picture Experts Group-4 Part 10 Advanced Video Coding standard/International Telecommunication Union, Telecommunication Sector H.264 recommendation.

Moreover, another advantage/feature is the apparatus having the video encoder and video quality analyzer as described above, wherein the encoding of the video bitstream is performed in multiple passes, so that a re-encoding of the video bitstream only requires a final encoding pass.

Further, another advantage/feature is the apparatus having the video encoder and video quality analyzer as described above, wherein the video bitstream includes a plurality of scenes, and the re-encoding setup involves limiting a number of the plurality of scenes to be re-encoded to a maximum number N of scenes from among any of the plurality of scenes having the encoder compression artifacts less than a threshold.

Also, another advantage/feature is the apparatus having the video encoder and video quality analyzer as described above, wherein the video bitstream includes a plurality of scenes, and the re-encoding setup involves limiting a number of the plurality of scenes to be re-encoded such that only scenes, from among the plurality of scenes, with the encoder compression artifacts less than a threshold are re-encoded.

Additionally, another advantage/feature is the apparatus having the video encoder and video quality analyzer as described above, wherein the video bitstream includes a plurality of scenes, and the re-encoding setup involves limiting a number of the plurality of scenes to be re-encoded such that only X % of the plurality of scenes having the encoder compression artifacts less than a threshold are re-encoded. X represents one of an integer and a non-integer value.

Moreover, another advantage/feature is an apparatus for use with a multi-pass video encoder that includes a video quality analyzer. The video quality analyzer is for performing a video quality analysis of the video bitstream for a given encoding pass to detect encoder compression artifacts in the video bitstream, and providing the video encoder with information relating to the encoder compression artifacts to enable a re-encoding setup of the video encoder to reduce an occurrence of the encoder compression artifacts in subsequent re-encoding passes. At least one of the video quality analysis and the re-encoding setup are automated.

Further, another advantage/feature is the apparatus having the video quality analyzer as described above, wherein the video quality analyzer performs the video quality analysis by computing visual quality metrics.

Also, another advantage/feature is the apparatus having the video quality analyzer as described above, wherein the re-encoding setup involves adjusting a target bit rate.

Additionally, another advantage/feature is the apparatus having the video quality analyzer as described above, wherein the video encoder includes a deblocking filter, and the re-encoding setup involves adjusting a strength of the deblocking filter.

Moreover, another advantage/feature is the apparatus having the video quality analyzer as described above, wherein the re-encoding setup involves adjusting encoding parameters.

Further, another advantage/feature is the apparatus having the video quality analyzer as described above, wherein a total number of re-encoding passes is constrained to a maximum value.

Also, another advantage/feature is the apparatus having the video quality analyzer as described above, wherein the video quality analyzer outputs a log file with data intended to assist an operator during assisted re-encoding.

Additionally, another advantage/feature is the apparatus having the video quality analyzer as described above, wherein the video encoder is compliant with the International Organization for Standardization/International Electrotechnical Commission Moving Picture Experts Group-4 Part 10 Advanced Video Coding standard/international Telecommunication Union, Telecommunication Sector H.264 recommendation.

Moreover, another advantage/feature is the apparatus having the video quality analyzer as described above, wherein the encoding of the video bitstream is performed in multiple passes, so that a re-encoding of the video bitstream only requires a final encoding pass.

Further, another advantage/feature is the apparatus having the video quality analyzer as described above, wherein the video bitstream includes a plurality of scenes, and the re-encoding setup involves limiting a number of the plurality of scenes to be re-encoded to a maximum number N of scenes from among any of the plurality of scenes having the encoder compression artifacts less than a threshold.

Also, another advantage/feature is the apparatus having the video quality analyzer as described above, wherein the video bitstream includes a plurality of scenes, and the re-encoding setup involves limiting a number of the plurality of scenes to be re-encoded such that only scenes, from among the plurality of scenes, with the encoder compression artifacts less than a threshold are re-encoded.

Additionally, another advantage/feature is the apparatus having the video quality analyzer as described above, wherein the video bitstream includes a plurality of scenes, and the re-encoding setup involves limiting a number of the plurality of scenes to be re-encoded such that only X % of the plurality of scenes having the encoder compression artifacts less than a threshold are re-encoded. X represents one of an integer. and a non-integer value.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for multi-pass video encoding, comprising:
    encoding a video bitstream in a given encoding pass; and
    performing a video quality analysis of the video bitstream encoded in the given encoding pass to detect encoder compression artifacts therein;
    performing a re-encoding setup with respect to the video bitstream to reduce an occurrence of the encoder compression artifacts in subsequent re-encoding passes, based on information obtained from the video quality analysis relating to the encoder compression artifacts,
    wherein the video bitstream includes a plurality of scenes, and the re-encoding setup involves selectively limiting, on a scene-basis, a number of the plurality of scenes to be re-encoded to less than all of the plurality of scenes.

2. The method of claim 1, wherein said step of performing the video quality analysis comprises computing visual quality metrics.

3. The method of claim 1, wherein the re-encoding setup involves adjusting a target bit rate.

4. The method of claim 1, wherein the encoder includes a deblocking filter, and the re-encoding setup involves adjusting a strength of the deblocking filter.

5. The method of claim 1, wherein the re-encoding setup involves adjusting encoding parameters.

6. The method of claim 1, wherein said step of performing the video quality analyzer comprises outputting a log file with data intended to assist an operator during assisted re-encoding.

7. The method of claim 1, wherein said video encoder is compliant with the International Organization for Standardization/International Electrotechnical Commission Moving Picture Experts Group-4 Part 10 Advanced Video Coding standard/International Telecommunication Union, Telecommunication Sector H.264 recommendation.

8. The method of claim 1, wherein the encoding of the video bitstream is performed in multiple passes, so that a re-encoding of the video bitstream only requires a final encoding pass.

9. The method of claim 1, wherein the number of the plurality of scenes to be re-encoded is limited to a maximum number N of scenes, wherein a total number of scenes included in the plurality of scenes is greater than the maximum number N of scenes.

10. The method of claim 1, wherein the number of the plurality of scenes to be re-encoded is limited such that only scenes, from among the plurality of scenes, with the encoder compression artifacts less than a threshold are re-encoded.

11. The method of claim 1, wherein the number of the plurality of scenes to be re-encoded is limited to X % of the plurality of scenes, wherein X represents one of an integer and a non-integer value having a value less than 100.

12. The method of claim 1, wherein the maximum number N of scenes includes ones of the plurality of scenes having a worst quality as compared to remaining ones of the plurality of scenes.

13. A method for use with a multi-pass video encoder, the method comprising:
    performing a video quality analysis of a video bitstream for a given encoding pass to detect encoder compression artifacts in the video bitstream; and
    providing the video encoder with information relating to the encoder compression artifacts to enable a re-encoding setup of the video encoder to reduce an occurrence of the encoder compression artifacts in subsequent re-encoding passes,
    wherein the video bitstream includes a plurality of scenes, and the re-encoding setup involves selectively limiting, on a scene-basis, a number of the plurality of scenes to be re-encoded to less than all of the plurality of scenes.

14. The method of claim 13, wherein said performing step comprises computing visual quality metrics.

15. The method of claim 13, wherein the re-encoding setup involves adjusting a target bit rate.

16. The method of claim 13, wherein the encoder includes a deblocking filter, and the re-encoding setup involves adjusting a strength of the deblocking filter.

17. The method of claim 13, wherein the re-encoding setup involves adjusting encoding parameters.

18. The method of claim 13, wherein said performing step comprises outputting a log file with data intended to assist an operator during assisted re-encoding.

19. The method of claim 13, wherein the multi-pass video encoder is compliant with the International Organization for Standardization/International Electrotechnical Commission Moving Picture Experts Group-4 Part 10 Advanced Video Coding standard/International Telecommunication Union, Telecommunication Sector H.264 recommendation.

20. The method of claim 13, wherein the encoding of the video bitstream is performed in multiple passes, so that a re-encoding of the video bitstream only requires a final encoding pass.

21. The method of claim 13, wherein the number of the plurality of scenes to be re-encoded is limited to a maximum number N of scenes, wherein a total number of scenes included in the plurality of scenes is greater than the maximum number N of scenes.

22. The method of claim 13, wherein the number of the plurality of scenes to be re-encoded is limited such that only scenes, from among the plurality of scenes, with the encoder compression artifacts less than a threshold are re-encoded.

23. The method of claim 1, wherein the number of the plurality of scenes to be re-encoded is limited to X % of the plurality of scenes, wherein X represents one of an integer and a non-integer value having a value less than 100.

24. The method of claim 13, wherein the maximum number N of scenes includes ones of the plurality of scenes having a worst quality as compared to remaining ones of the plurality of scenes.

* * * * *